Oct. 4, 1960   W. H. MacCLOYGSTON BOND   2,954,810
NUT HULLING MACHINE
Filed Dec. 15, 1958   3 Sheets-Sheet 1
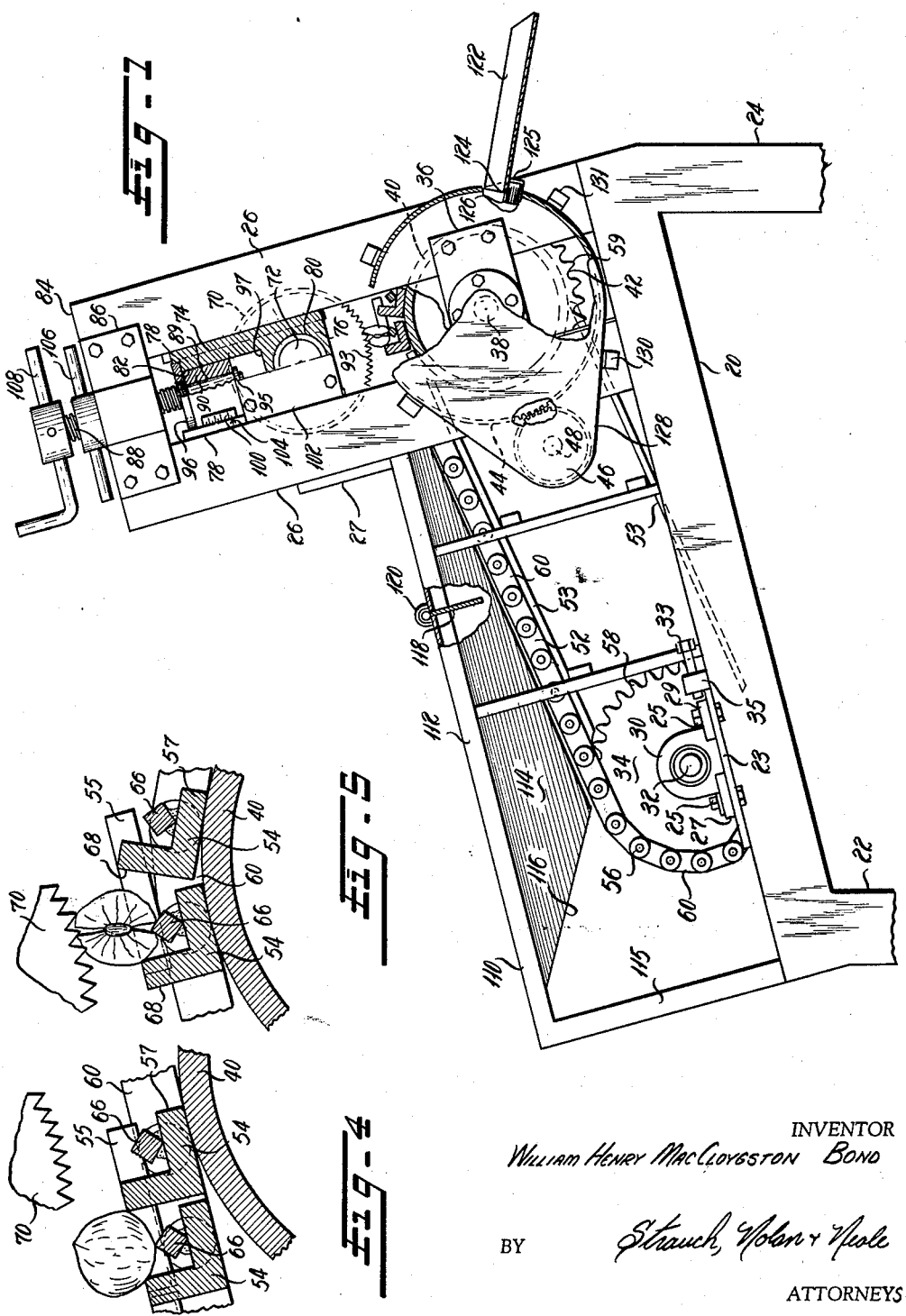
INVENTOR
William Henry MacCloygston Bond
BY
Strauch, Nolan & Neale
ATTORNEYS

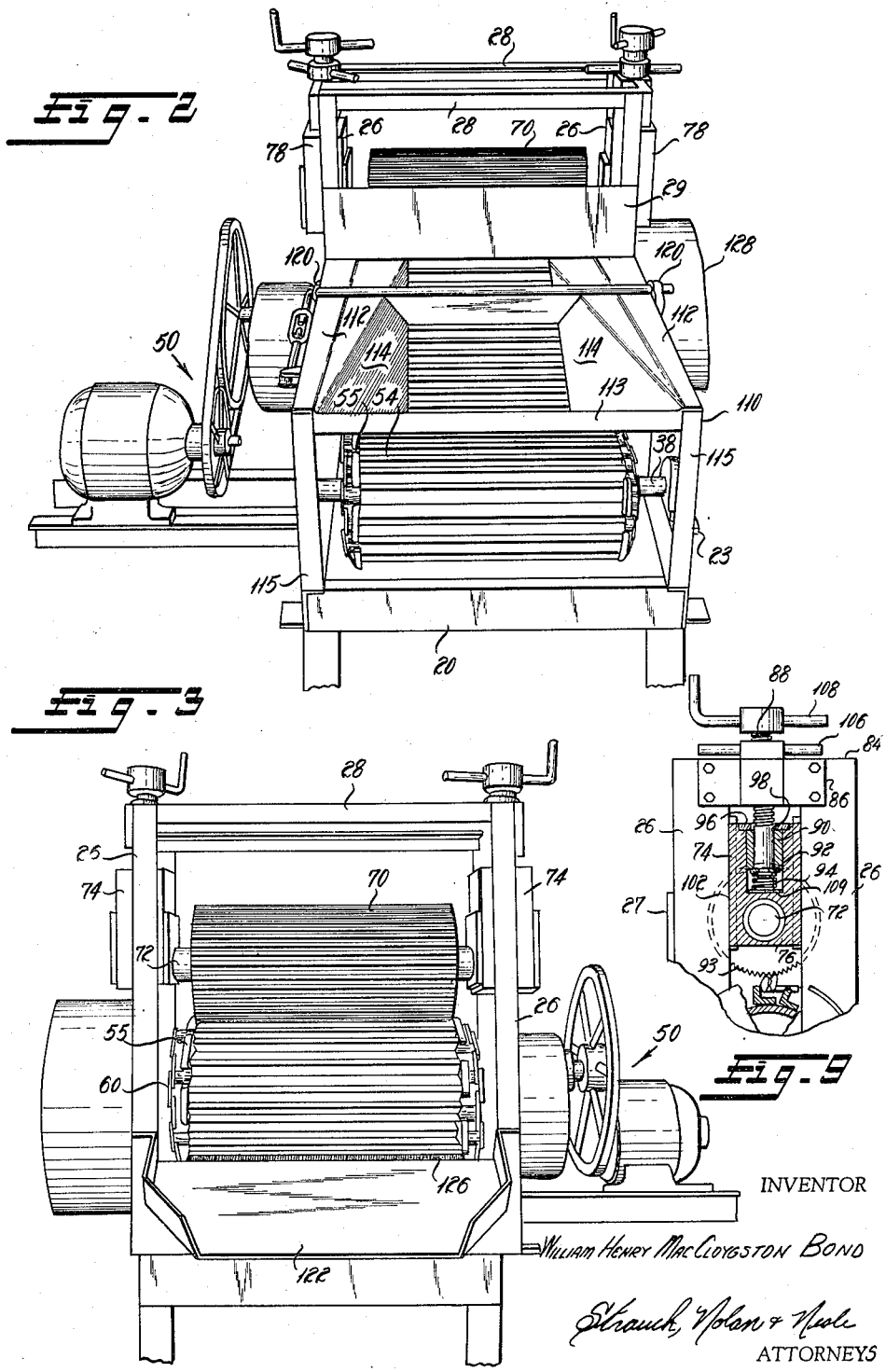

Oct. 4, 1960 W. H. MacCLOYGSTON BOND 2,954,810
NUT HULLING MACHINE
Filed Dec. 15, 1958 3 Sheets-Sheet 3
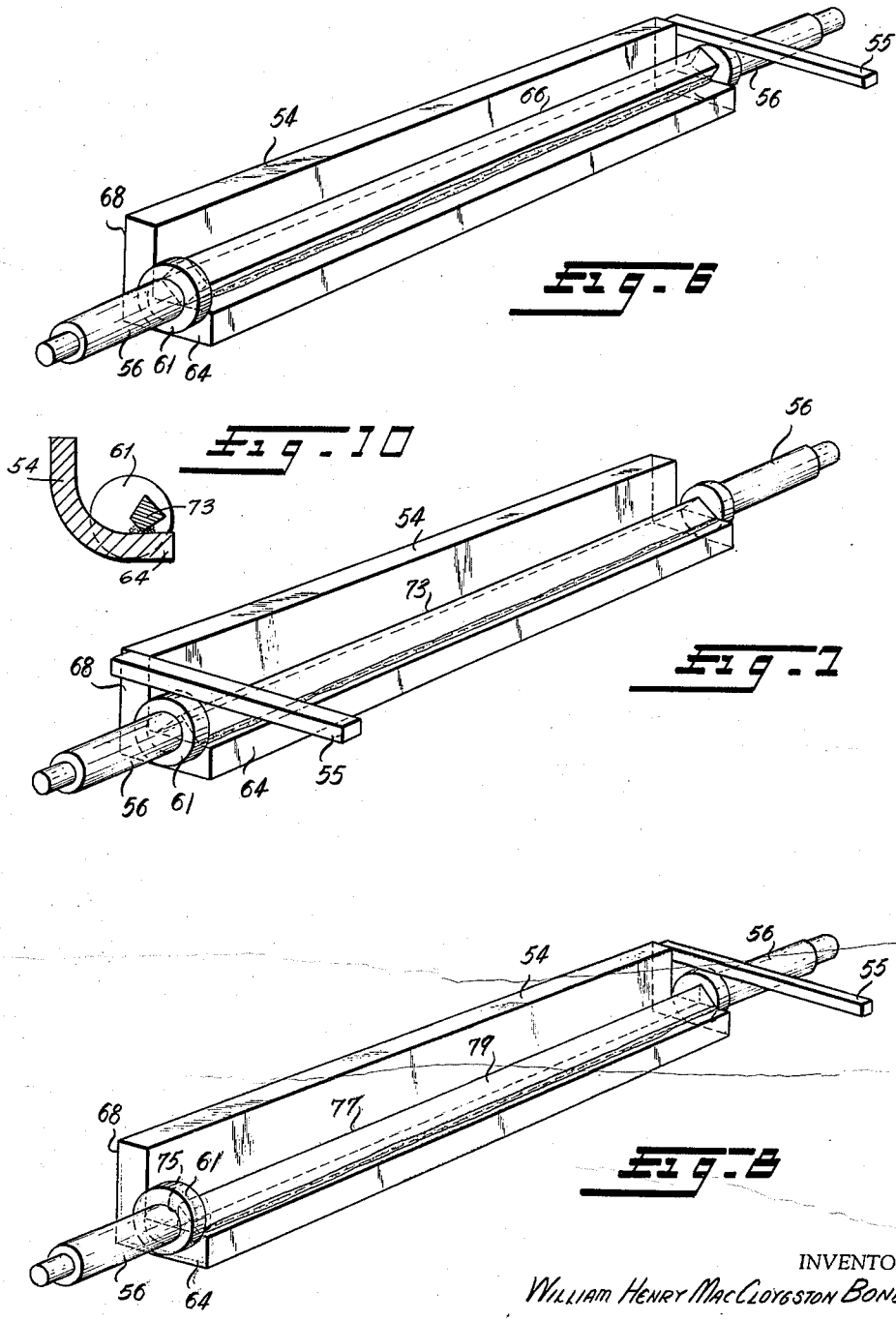
INVENTOR
WILLIAM HENRY MacCLOYGSTON BOND
BY
ATTORNEYS United States Patent Office 2,954,810
Patented Oct. 4, 1960

2,954,810
NUT HULLING MACHINE

William Henry MacCloygston Bond, Washington, D.C., assignor to Am-Car Dekernelizer Corporation, Arlington, Va.

Filed Dec. 15, 1958, Ser. No. 780,488

19 Claims. (Cl. 146—11)

This invention relates to nut-hulling apparatus and more particularly to a machine for hulling or dekernelizing nuts having thick, tough shells.

Species of nuts known as "attalea cohune" and "babassu" (the former is found chiefly in Mexico, Central and South America, the West Coast of Africa and the Orient; the latter is found chiefly in Brazil) have proven to be extremely valuable for a great variety of purposes. The oil which is contained in the kernels and obtained by expression from the nut kernels is a high quality vegetable oil that can be used in food preparations such as salad oils, confections and bakery products, cooking fats, shortening and oleomargarine. It can also be used in lubricants, as an ingredient in cosmetic soaps and as a flux in the tin and other metal processing industries.

The expressed kernel pulp may be pressed into cakes and used for cattle feed.

The fibrous nut shell, though considered a by-product, is of such hardness that it can be ground into industrial flour to be used as a filler in the manufacture of hard plastics such as Bakelite, Formica and the like, and as an ingredient of a lubricant used in the oil-well drilling industry. The hard shell is also a prime source of the activated carbon that is used by the rapidly growing filter industry. All air heating, cooling and purification systems in use today employ carbon filters comprising activated carbon made from the hard shells of the above mentioned and like nuts. Air deodorizers also use such activated carbon.

Despite the great demand for such nuts created by the many-faceted uses mentioned above, and notwithstanding the fact that such nuts are found in great abundance (the combined annual crop of "cohune" and "babassu" is estimated to be in excess of five hundred million tons), the currently available supply of shelled kernels and separated hulls is extremely small. This scarcity is directly attributable to the primitive and slow methods employed in freeing the kernels from the hard shells which, in most cases, are approximately 3/16 of an inch in thickness and require an approximate hull-cracking pressure of the order of 2100 p.s.i. The usual hulling operation as now practiced is a hand operation which involves placing the nut on a sharp blade and striking it with a heavy mallet or hammer. By such hulling methods some workers can provide about five pounds of kernels per day.

The great cost of hulling and the small production rates have been detriments to the profitable development of the vast natural resource created by the growth of these and like nuts.

It, accordingly, is a primary object of the present invention to provide a nut dekernelizing machine which will effectively and economically hull thick, hard-shelled nuts.

Other objects of the present invention are to provide a novel nut-dekernelizing machine:

(1) which is adjustable and is thus capable of use with varying size nuts;

(2) which is light-weight and is capable of being rapidly transported to the various nut-harvesting areas;

(3) which is capable of hulling hard-shelled nuts such as the "cohune" and "babassu" in quantities that make them commercially attractive to large cosmetic and soap manufacturers, as well as to manufacturers of candy, bakery products, etc.;

(4) which contains novel conveyor bar-hulling blade elements designed to efficiently dekernelize hard shell nuts with minimum effort and at minimum expense and which have a long maintenance-free life;

(5) wherein the conveyor bar-hulling blade elements are of generally L-shaped configuration in cross-section and formed into an endless belt type conveyor, the adjacent elements of which provide a series of laterally elongated nut receiving pockets, each of which contains an upstanding, laterally continuous knife edge having an angularly disposed hull deflecting face along the leading side of the knife edge for tearing the shell apart as the pocketed nuts pass between an axially toothed idler pressure roll and an opposed anvil roll tangentially contacting the knife edge-supporting conveyor bar leg opposite the knife edge and substantially in the plane containing the axes of the opposed rolls.

These and other objects of the invention will become more fully apparent as the description proceeds in connection with the accompanying drawings wherein:

Figure 1 is a side elevation view partly in section of a preferred embodiment of the instant invention;

Figure 2 is a rear perspective view of the apparatus shown in Figure 1;

Figure 3 is a front perspective view of the apparatus shown in Figure 1;

Figure 4 is an enlarged, fragmental sectional view of a nut in position in the conveyor pockets of the apparatus shown in Figures 1, 2 and 3 at a point just prior to that at which the hulling force is applied to hull the nut;

Figure 5 is a view similar to that of Figure 4, but shown at the point at which the maximum hulling force is applied to fracture the hull, separate it into two parts and free the kernel;

Figures 6, 7 and 8 are isometric views of different embodiments of individual conveyor bars usable in providing a dekernelizing machine embodying the present invention;

Figure 9 is a fragmental side elevational view of the support posts of Figure 3 and idler roll bearing housings with the latter partially in section to illustrate a modified adjustable support bearing arrangement.

Figure 10 is a sectional view through a modified conveyor bar of arcuate cross-section provided with a knife blade wherein the trailing blade edge is disposed at a lesser angle than the leading edge.

The general structure of the novel apparatus of the instant invention may best be understood by reference to Figures 1, 2 and 3. The superstructure onto which the various elements of the invention are placed generally comprises a frame base 20 preferably inclined to the horizontal by means of rear legs 22 and front legs 24 of unequal length, and to which base 20 is rigidly secured, as by welding or the like. The specific angle of inclination of base 20 is not critical, the primary purpose of the inclination being to take advantage of gravity forces to facilitate leveling and lateral axial orientation of the nuts on the conveyor belt. Base 20 may be formed of four steel channel bars or I-beams welded together at their ends to form a rectangular support frame. Projecting upwardly at right angles to base 20 and at the higher end thereof are two laterally opposed pairs of support bars or posts 26, the members of each pair being longitudinally spaced from one another along the opposite sides of frame base 20 and rigidly secured by welding or the like to the opposite outer side faces of base 20. Corresponding members of each of the pairs of support posts 26 are joined together at their uppermost ends by means of cross-plates 28, cross-plate 27 being additionally provided to impart additional strength to the lower ends of each pair of support posts 26.

On the upper edge of each side of base 20 in laterally opposed relation adjacent the lower rear end thereof are journal brackets 30 adapted to receive bearings (not shown) for supporting the opposite ends of an idler shaft 32. Each bracket includes a plate-like base 23 slidably mounted on each side member of base 20 (see Figures 1 and 2) and provided with longitudinally extending slots adapted to receive nut and bolt assemblies 25 which pass through bolt openings (not shown) in the base side members to adjustably secure brackets 30 for limited longitudinal sliding movement to base 20. Screws 33 carried by internally threaded upstanding bosses 35 fixed to base 20 are adapted to bear against upstanding lugs or bosses 29 formed on brackets 30 to thereby urge brackets 30 towards the lower end of base 20. Mounted on idler shaft 32 adjacent the inner side of each bracket 30 are idler sprockets 34 which are suitably fixed relative to idler shaft 32 for rotation therewith.

Extending between each pair of support bars 26 and secured thereto at points slightly above base 20 are lower bearing blocks 36 adapted to receive bearings (not shown) for journalling the ends of a driving roll shaft 38. Driving or anvil roll 40 is rigidly secured to driving roll shaft 38 by welding or the like and is provided at each end with a drive sprocket wheel 42 rigidly secured thereto with its sprocket teeth laterally aligned with the teeth of the opposite wheel 42 to assure simultaneous driving contact with the opposite sides of the conveyor belt to be presently described. Mounted on one end of driving roll shaft 38 projecting outwardly from base 20 is a roll gear 44 secured against rotational movement relative to shaft 38 by means of a conventional key and keyway provided in both driving roll shaft 38 and driving roll gear 44. Roll gear 44 meshingly engages drive gear or pinion 46 which is non-rotatably mounted on a countershaft 48 journalled in journal blocks 49 mounted on opposed posts 26 and driven by any suitable conventional driving means indicated generally at 50.

An endless conveyor belt designated generally at 52 and comprising an important part of the present invention extends around idler sprockets 34 and sprocket wheels 42 with its opposite runs slidingly supported by continuous sheet supports 53 which extend laterally of conveyor belt 52 and longitudinally between idler sprockets 34 and driving roll 40 and their respective support faces lying in planes which are tangent to the periphery of roll 40. Sheet supports 53 may be of metal or other suitable material. Conveyor belt 52 comprises a series of novel conveyor bars 54 (see Figures 6, 7 and 8) which have body portions of L-shaped configuration in cross-section and whose length is approximately equal to that of anvil roll 40. Headed stub-shafts 56 adapted to be engaged by teeth 58 of idler sprockets 34 and teeth 59 of drive sprocket wheels 42 extend outwardly from each end of conveyor bars 54 and are secured thereto by welding their respective heads 61 to the opposite ends of each of the conveyor bars 54. The axes of stub-shafts 56 preferably lie in the plane of the inner face of the horizontally disposed body leg about ⅓ of the pocket width ahead of the inner face of the trailing right angularly related body leg 68 to substantially balance the rotational forces due to the mass of the respective conveyor bars. The outer shank ends of stub shafts 56 are reduced in diameter to be slip-fitted in openings provided in the opposite ends of conveyor belt connector links 60 in conventional chain link fashion.

Rigidly secured to the upper face of leg 64 of each conveyor bar 54 and extending throughout the length of the latter is a knife element 66. In one embodiment, knife element 66 is of square cross-section and is mounted on leg 64 to present a corner edge (see Figure 6) for penetration into the nuts to be hulled. Knife elements 66 are preferably of a harder material than conveyor bars 54, such as nickel-bearing steel, and are welded to conveyor bars 54, as clearly shown at 67 in Figures 4 and 5. When the knife elements 66 are worn or broken and in need of replacement, the weld can be broken, as by remelting, so the blade can be rewelded to present a new corner edge in position for use or replaced by a new knife element welded to conveyor bars 54. As best shown in Figure 1, the knife edge at the point of maximum pressure application lies substantially in the plane containing the axes of anvil roll 40 and the idler pressure roll to be presently described.

Alternatively, differentially shaped knife elements may be employed, such as the triangular element 73 shown in Figure 7. If desired the knife elements may be made integral with conveyor bars 54, though this necessitates the replacement of an entire conveyor bar when the knife edge is worn or broken. An integral construction would also involve the use of the same material for both the conveyor bar and the knife element and would result, therefore, in a needless use of costly high alloy steel which should be used for the knife elements.

Still another form of blade construction is that shown in Figure 8, in which a blade 77 of triangular cross-section is used. The rear or trailing face 75 of this blade is normal to leg 64 and its front or leading face 79 is inclined at a predetermined angle to the vertical. As will be more fully apparent hereinafter, such a construction incorporates many of the advantages of the other blade embodiments while permitting a saving in material costs due to its smaller cross-section.

Knife elements 66 (or 73 or 77) should be so located relative to legs 64 of their respective supporting conveyor bars 54 that the particular nuts to be hulled cannot wedge between the knife and the leg 68 of the supporting conveyor bar (see Figures 4 and 5). Legs 68 should project out beyond the outermost point of the knife elements sufficiently so that adjacent legs 68 form pocket sides with the trailing legs serving as stops to prevent rearward movement of the nuts as they move toward the crushing rolls and as they are compacted between the knife element and crushing roll 70, to be described hereinafter in greater detail. Horizontal legs 64 of conveyor bars 54 should be of sufficiently short width to preclude the possibility of the nuts wedging themselves between knife elements 66 and the back of the leading legs 68 of the immediately preceding conveyor bar 54. Conveyor bars 54 are maintained in predetermined side-by-side separated relation by links 60 sufficiently to permit "flexibility" of the conveyor belt 52 in passing around roll 40 and sprockets 34 and 42.

Generally speaking, the relative sizes and positions of legs 64 and 68 of each conveyor bar, blades 66 (and 73 and 77) and leg 68 of the immediately preceding conveyor bar 54 should be such that there will be 3-point contact between the nut to be hulled and the foregoing elements as the nuts advance toward the crushing rolls (see Figure 4). When the bottom of the nut rests on the edge of the cutting blade, the sides of the nut contact legs 68 of the two bars 54 between which the nut is situated. Since the size of the nuts in any given batch will vary somewhat, this condition will not always be maintainable but may be approached by pre-classification of the nuts to be hulled.

Specific dimensions of the various elements of the conveyor belt must, of course, be varied depending upon the size of the nuts to be hulled. Usually, the exposed cutting portion of each cutting blade will be short enough so that the nut kernels are not cracked along with their shells. Since the shell thickness of the "cohune"

and "babassu" nuts is approximately ³⁄₁₆″, the blade penetration should ordinarily not be greater than ¹⁄₁₆″ to ⅛″. Penetration of the lower portion of the nut to this extent, together with ¹⁄₁₆″ penetration on its upper portion effected by the cutting teeth 93 (see Figure 1) of crushing roll 70, is assured by adjustably supporting roll 70 for movement toward and away from roll 40. If desired, different belts may be used under varying service conditions.

To limit relative rotating movement of the respective conveyor bars 54 and also lateral movement of the nuts out of their receiving pockets as they are carried toward the crushing rolls between adjacent conveyor bars 54, stop bars 55 (see Figures 6–8) are secured by welding or the like to alternate bars 54 at their opposite ends (the stop bars are thus "staggered"). These bars preferably are of a length to extend past an immediately adjacent leading bar to cooperate with two successive pockets and prevent the nuts from rolling into the conveyor belt links 60 and fouling conveyor belt 52, yet do not impair "flexibility" of the conveyor belt.

Mounted on vertical sliding adjustment between each pair of support bars 26 and above the driving or anvil roll assembly is a vertically elongated journal housing indicated generally at 74, adapted at its lower end to receive bearings for journalling the ends of shaft 72 of toothed crushing roll 70 (which is an idler roll). Each housing 74 comprises a bearing block 76 (see Figure 1) of square cross-section whose sides are of sufficient width to permit the block to fit snugly for sliding movement between vertically extending guide bars 78 secured to support bars or posts 26. Bearing block 76 contains a horizontal through-bore 80 adapted to receive the bearings into which the ends of shafts 72 of crushing roll 70 are journalled. An axial bore 82 is centrally located in the upper portion of housing 74 above bearing block 76 and the upper ends of the housing are provided with suitably tapped openings (not shown) for a purpose to be presently pointed out.

Mounted between each pair of support bars 26 at their uppermost ends 84 is a stationary nut 86 having a vertically threaded bore adapted to receive a vertically extending screw shaft 88 whose lowermost end portion 89 is of a diameter no greater than the root diameter of the screw threads and extends into axial bore 82 in bearing block 76. Portion 89 of screw 88 is threadless and mounts a combined thrust sleeve and journal bearing 90 which, for ease of assembly and replacement, is fabricated in two halves. The outer diameter of sleeve 90 has a snug fit in axial bore 82 and its inner diameter is such as to journal the threadless portion 89 of screw shaft 88. Screw shaft 88, near its lower end, is provided with an annular groove which is adapted to receive a split washer 95 whose outer diameter is larger than the inner diameter of sleeve 90 so as to support sleeve 90 against axial downward disassociation from screw shaft 88.

In the preferred embodiment of Figures 1 through 3, a cap plate 96 having a centered threaded aperture the walls of which overlie the upper ends of sleeve 90 is bolted to the upper end of housing 74 and threaded onto screw shaft 88, thereby locking sleeve 90 in housing bore 82 and connecting housing 74 and screw 88 for relative axial movement upon rotation of screw shaft 88. Cap plate 96, housing 74, and sleeve 90 accordingly are suspended on the lower ends of the respective screw shafts 88 for limited relative axial movement while assuring direct transmission of the cracking reaction forces from housing 74 to the threads of screw shafts 88 and their respective support nut members 86. As a consequence, a positive cracking force dependent only upon the size and hardness of the nut hulls is developed in operation of the machine.

A suitable scale 100 is provided on outer retainer plate 102 which is bolted to the side of housing 74. Adjacent scale 100, on one of the guide bars 78, is an indicator mark 104 enabling the roll 70 to be adjusted with respect to roll 40 to assure free passage of the kernel of the particular nuts being cracked.

Near the upper end of each screw 88 and above and adjacent its associated nut 86 is a locknut 106 which threadedly engages screw 88. At the upper end of each screw 88 and extending in opposite directions therefrom is a screw handle 108 which is secured against movement relative to the screw by suitable locking means (such as a tapered pin).

While the positive or direct transmission of the cracking force through housing 74 and cap plate 96 is preferable, since a cracking force of 2100 p.s.i. is required to crack a single nut of certain of the varieties heretofore mentioned and simultaneous cracking of the 10 or more nuts lying in the individual pockets requires an adjustable roller mount capable of resisting a force ten or more times as great as the individual cracking force, an alternative cushioned mounting of roller 70 might readily be provided by a structure like that shown in Figure 9. As there shown, plate 96 is provided with a centered aperture 98 of a diameter to freely pass the threaded portion of screw shaft 88. The lower end of each shaft 88 is preferably reduced in diameter and projects beyond split washer 95 into a relaxed coil spring 94 the opposite ends of which seat in the bottom of bore 82 of housing 74 and against washer 95 opposite the lateral shoulder 92 formed by the adjacent enlarged main body portion of screw shaft 88. If desired, a spring centering cap 109 may be provided at the lower end of spring 94 as illustrated or at the upper end to cooperate with the lower end of screw shaft 88. By designing each of the springs 94 to resist its proportionate part of the total 2,100 lb. reaction force, that is, to yield when its proportionate resistance force is exceeded, a machine is provided having a safety factor to relieve the rollers from jamming or stripping the threads of screw shafts 88 or cap plates 96 should stones or other hard foreign matter or unusually large size and hard hulled nuts pass through the machine. This relief action occurs due to the free relative axial movement of housings 74 upwardly with respect to their respective screw shafts when springs 94 yield. In this form of the invention, the ultimate cracking pressure can be readily varied or adjusted by varying the stiffness of springs 94.

Rigidly secured to base 20 and the lowermost of the support bars 26 is an upstanding frame 110 which consists generally of a pair of laterally spaced side bars 112, a connecting horizontal end bar 113 and a series of vertical posts 115. Projecting downwardly and inwardly from bars 112, at an angle to the vertical and terminating just short of legs 68 of conveyor bars 54, are plate-like elements 114 which serve as sides of a hopper into which the nuts to be hulled are placed. A similar plate-like element 116 projects downwardly and inwardly from horizontal bar 113 to form the rear side of the hopper. The forward side of the hopper is formed by the previously described cross-plate 27.

A nut leveling plate 118 is mounted for free depending swinging movement on a cross shaft 119 supported at its ends on bars 112 by means of brackets 120.

An inclined chute adapted to receive the cracked hulls and nut kernels and to convey them to suitable means for further processing is mounted on the forward most posts 26 with its upper end 124 disposed at the approximate level of the center line of roll 40. Inserted in the housing formed by the upper end 124 of chute 122 and an L-shaped bar 125 secured to the bottom face of end 124 of the chute are brushes 126 having bristles which are of sufficient length to extend slightly beyond the outermost edge of legs 68 of conveyor bars 54 and to, therefore, remove pieces of hull and kernel which fail to drop off conveyor belt 52 into chute 122 (see Figures 1 and 3).

A conventional safety guard 128 is mounted by means of bolts 130 and mounting brackets 131 on supports 26 to enclose gears 44 and 46.

In operation, nuts to be hulled are deposited in the hopper formed by plate-like members 114 and 116. As the conveyor belt 52 moves to traverse its upper run clockwise as viewed in Figure 1 toward rolls 40 and 70, leveling plate 118 reduces nut-congestion in the latterally extending pockets formed between each pair of conveyor bars 54. The position of the nuts on the conveyor belt 52 at a point in advance of roll 40 and 70 is clearly shown in Figure 4. It will be seen that at this point there is approximate 3-point contact between the nut and the legs 68 of the pocket forming conveyor bars 54 and cutting knife 66.

At approximately the point at which the teeth of the crushing roll 70 make contact with the nut, the forward conveyor bar (denominated as 57 in Figure 5) has "leaned forward" slightly, following the curvature of driving or anvil roll 40. It will be appreciated, therefore, that the diameter of roll 40 should be sufficiently small to assure adequate forward leaning of the conveyor bars after passage beyond the point of tangency to clear the way for the leading nut half. The additional space provided between cutting knife 66 and leg 68 of the leading conveyor bar 57 by this "leaning forward" serves to provide the front half of the cracked hull with "breathing space" and therefore facilitates the relative forward movement of the freed leading half of the nut hull under influence of the camming force applied by knife face 79 and cracking of the hull. As is apparent from Figure 5, trailing leg 68 of conveyor bar 54 serves as a stop to prevent retrograde movement of the nuts until the hulling operation is completed.

As the conveyor 52 continues to move forward from the position shown in Figure 4 to the position shown in Figure 5, teeth 93 of crushing roll 70 and cutting knives 66 penetrate the nut hulls at substantially diametrically opposite points with the knives 66 solidly backed up by the substantially in-line contact of leg 64 and the surface of anvil roll 40. The hull-separating force exerted by the forward face 79 of each cutting knife 66 has a horizontal component which is highly effective in tearing the nut hull halves apart since the trailing half of the hull is tightly gripped between teeth 93, the trailing leg 68 of the supporting conveyor bar and the back edge of knife 66.

As has heretofore been indicated, teeth 93 on crushing roll 70 and cutting knives 66 are adjustably disposed by relative positioning of roll 70 with respect to roll 40 so that tooth and knife penetration is such that the nut kernels will not be contacted, cracked or crushed as the nuts pass through the hulling operation. It has been found that for a nut of approximately 3/16" hull thickness, the teeth 93 and knives 66 should be limited to a maximum penetration of 1/16" to 1/8" and the adjustment of roll 70 assures that such penetration will take place.

The advantages of the cutting knife constructions described heretofore and particularly that shown in Figure 8 may now readily be seen. Since the nuts are in 3-point contact with the cutting knife and legs 68 of adjacent conveyor bars, only forward face 79 of the cutting knife will have an effective horizontal component of force tending to pull the cracked nut hull halves apart. The horizontal component of force exerted by the rear face 75 is effectively neutralized by the opposing horizontal force exerted by leg 68 (which serves as a rear-movement stop, as heretofore described). In view of this fact, an angular rear face, though inherent when mere square bar stock is employed for the knives, is not necessary for effecting cracking of the nut hulls and acts to increase the crushing force required to effect entry of the cutting knife into the nut hull. For this reason, a vertical rear face 75 opposing vertical leg 64 of conveyor bar 54 as disclosed in the embodiment of Figure 8 may well be effective to lower the pressure forces now obtaining in the preferred knife form of Figures 1 through 6 to offset the multiple cutting edge feature provided by the square type knife blade.

A further advantage obtaining in the Figure 8 blade modification is a savings resulting from reduced material costs (the reduced cross-section requires less nickel-bearing steel for a given cutting knife).

As the conveyor belt continues to rotate, the cracked hull and kernal pass the closest approach point of roll 70 and the opposed conveyor bar leg 64 and are free to fall by gravity into chute 122. Portions of the hull which, because of the heavy contact pressures created, do not freely fall from conveyor bars 54 are removed by means of brushes 126.

To compensate for the varying sizes of the nuts which are to be hulled, crushing roll 70 may be adjusted vertically by rotation of screw handles 108. In the preferred embodiment, rotation of the screw handle in a clockwise direction will result in a bodily downward movement of screw 88 with respect to stationary nut 86 and a corresponding upward threading movement of housing 74 and bearing block 76 between guide bars 78 and result in an accompanying movement of crushing roll 70 away from anvil roll 40. A similar adjustment of roller 70 in the alternate embodiment of Figure 9 is obtained by rotation of screw handles 108 counterclockwise. Such rotation will result in bodily upward movement of screw shafts 88 and their associated washers 95, bearing sleeves 90 and caps 96 to lift housings 74, bearing blocks 76 and crushing roll 70 and its shaft 72 upwardly away from roll 40. Thus crushing roll 70 is readily adjustable to assure a sufficient space between its teeth 93 and cutting knives 66 to freely pass the kernel of a selected nut variety therebetween and assure the desired penetration of teeth 93 and knives 66 into the nuts being hulled.

If it is desired to replace conveyor belt 52 with one having differently dimensioned conveyor bar pockets, screws 33 may be backed off to relieve the tension on the belt thus releasing it for removal. Similarly, screws 33 may be adjusted to increase the tension on conveyor belt 52 to take up any wear that may develop between stub shafts 56 and sprocket wheels 34 and 42.

Numerous modifications of the foregoing embodiments may be made within the spirit of the instant invention. For example, it is not absolutely essential that a perfectly L-shaped conveyor bar, as shown in Figures 4–8, be used. In lieu of an L-shaped bar, a bar of arcuate or like cross-section might be employed (Figure 10). Also, the face angles of the cutting knives may be varied depending upon the lateral tearing force and distance of movement of the hull halves laterally required to free the halves and the kernel and other service conditions (Figure 10). The greater the face angle, the greater the horizontal spreading force component but the less the hull-penetrating force component; and viceversa. The manufacturer must decide upon the proper balance for given service conditions or adopt, as do the preferred embodiment of Figures 1–6 and the alternate embodiment of Figure 7, a design wherein the two components are equal.

Nor is it essential that crushing roll 70 be separately regulable in a vertical direction by screw means at each end as in the machine assembly of Figures 1–3. If desired, a single screw shaft mechanism equivalent to that of the upper portion of housing 74 may be disposed laterally intermediate the ends of roll 70 to act on a cross beam carrying bearing blocks 76 at its opposite ends to permit the vertical adjustment of crushing roll 70 by means of a single adjustment screw shaft.

The advantages of the instant device are numerous. Locating the cutting knives on the conveyor bars substantially centered with respect to the axes of stub shafts 56 permits the positive backing of the conveyor bars by anvil roll 40 substantially opposite the exact point at which penetration of the hull by the knife edge takes place, resulting in more effective resisting of the penetration reaction forces on the cutting elements. Such centering also reduces the bending stresses on the cutting elements and the conveyor bars assuring longer and more efficient trouble-free life of the conveyor belt. The shape and relative relationship of the conveyor bars further assures that the cracked nut hulls and freed kernels are easily removed from the conveyor belt for further processing with a minimum of supervision.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A nut dekernelizing machine comprising a frame having upstanding supports at one end; a cross shaft at the other end of said frame having conveyor belt supporting sprocket wheels fixed thereon in laterally spaced opposed relation; a second cross shaft at said one end of said frame journalled between said upstanding supports and having conveyor belt supporting and driving sprocket wheels fixed thereon in laterally spaced opposed relation; an anvil surface disposed between said supporting and driving sprockets; a driven gear fixed to one end of said second cross shaft in laterally spaced relation to the adjacent supporting and driving sprocket; a drive shaft journalled for rotation in fixed relation to said second cross shaft and having a drive gear fixed thereto and meshingly engaged with said driven gear to drive said second shaft and said supporting and driving sprocket wheels as a unit; an idler roll shaft journalled at said one end of said frame in parallel relation to said second cross shaft and having a peripherally toothed crushing roll fixed thereto with its periphery disposed a predetermined fixed distance from said anvil surface; and an endless belt conveyor operatively supported between said supporting sprocket wheels and said supporting and driving sprocket wheels and adapted to pass through said space between said crushing roll and said anvil surface, said belt conveyor being composed of a series of link-connected conveyor bars each having a laterally directed upstanding knife edge generally paralleling the axes of rotation of said crushing roll and said anvil surface and an upstanding wall-like member disposed in spaced, parallel, follower relation to said knife edge and forming with said knife edge and the wall-like member of immediately preceding conveyor bars respective nut supporting pockets for receiving a plurality of laterally related nuts in knife edge-supported upwardly protruding relation to said pockets to dispose the uppermost periphery of said nuts in the path of the toothed periphery of said crushing roll; and means for imparting rotation to said drive shaft to move said conveyor belt with its pocketed nuts toward and through said space between said crushing roll and anvil surface thereby forcing said knife edge and said crushing roll teeth into the nut hull to a depth sufficient to split said hull and free the kernel without contacting the kernel itself.

2. The machine of claim 1 wherein said anvil surface is of arched configuration in cross section and so related to said conveyor belt supporting and driving sprocket wheels that said conveyor bars tangentially engage said anvil surface in the plane containing the axes of said second cross shaft and said idler roll and thereafter follow the arched contour of said anvil surface and tilt forwardly in the direction of movement of said conveyor belt to free the leading half of the trailing nut hull for forward separating movement under influence of the forward thrust component of the leading knife edge face.

3. The machine of claim 1 wherein the crushing roll is adjustably supported for relative movement toward and away from the anvil surface paralleling the plane containing the axes of said second cross shaft and said idler roll shaft whereby said machine may be adjusted to preselect said fixed distance and accommodate nuts of varying diameter and hull thickness so that the required cracking penetration of the hull by said idler roll teeth and said knife edge can be effected while avoiding contact with the kernel.

4. A conveyor bar adapted for use in a nut-dekernelizing machine comprising: an elongated base support having an uninterrupted lower abutment face and a transversely elongated upper face; an upstanding cutting knife extending longitudinally of and rigidly fixed to said upper face of said base support; rigid stop means at the trailing edge of said base support for limiting rearward movement of nuts to be hulled by means of said cutting knife; and cylindrical connector means at each end of said base support adapting said bar for linked connection to other like bars to form a link-type conveyor belt.

5. The conveyor bar of claim 4 wherein said cutting knife has angularly intersecting leading and trailing faces and the trailing face is disposed at a lesser angle to the vertical than its leading face.

6. The conveyor bar of claim 5 wherein the trailing face of said cutting knife is vertical and the leading face is at an angle to the vertical sufficient to provide a substantial forward force component adapted upon penetration of the hull of a nut to separate the nut hull along the line of penetration.

7. The conveyor bar of claim 4 wherein said stop means comprises the leg of a bar substantially of L-shaped cross-section, said base support forming the other leg thereof.

8. The conveyor bar of claim 4 wherein means are provided at least at one end of said bar for cooperation with an adjacent bar to limit relative rotational movement of adjacent bars as well as lateral movement of nuts to be retained in the pocket formed between said bars during movement of the nuts to the dekernelizing point.

9. The conveyor bar of claim 4 wherein said cutting knife is constructed of a harder material than the rest of said conveyor bar.

10. A conveyor bar adapted for a use in a nut-dekernelizing machine comprising: a base support having an uninterrupted lower abutment face and a transversely elongated upper face; a cutting knife extending longitudinally of and substantially throughout the length of said upper face of said base support, said knife being rigidly fixed to said base support and having angularly intersecting leading and trailing faces, the trailing face being at a lesser angle to the vertical than the leading face; rigid stop means at the trailing edge of said base support for limiting rearward movement of nuts to be hulled by means of said cutting knife; and cylindrical connector means at each end of said conveyor bar adapting said bar for driving cooperation with sprocket wheels for driving a conveyor belt composed of a series of said bars.

11. The conveyor bar of claim 10 wherein the trailing face of said cutting knife is vertical and the leading face is at an angle to the vertical sufficient to provide a substantial forward force component adapted upon penetration of the hull of a nut to separate the nut hull along the line of penetration yet at an angle less than that at which said knife would be ineffective to penetrate the hull of the nut to be dekernelized.

12. A conveyor belt comprising a plurality of individual conveyor bars operatively linked together by conventional chain-type link elements, each conveyor bar comprising a base support having an uninterrupted lower abutment face and a transversely elongated upper face, a cutting knife extending longitudinally of and rigidly fixed to said upper face of said base support, and rigid stop means at the trailing edge of said base support, said stop means of adjacent conveyor bars cooperating to provide a transversely elongated pocket for limiting forward and rearward movement of nuts to be hulled by means of said cutting knife as the nuts are conveyed to a hulling station.

13. The conveyor belt of claim 12 wherein said cutting knife has angularly intersecting leading and trailing faces and the leading face is at an angle to the vertical sufficient to provide a substantial forward force component of hull-separating magnitude yet forms with the trailing face an included angle assuring effective penetration of the hulls of the nuts to be dekernelized.

14. The conveyor belt of claim 12 wherein said stop means of two adjacent conveyor bars are so constructed relative to one another and to the cutting knife between them that a nut, positioned between said pair of stop means, will be in 3-point contact with said pair of stop means and with the cutting knife therebetween.

15. The conveyor belt of claim 12 wherein second stop means are provided at least at one end of each conveyor bar to limit relative rotational movement of adjacent bars during said dekernelizing operation.

16. The combination in a nut dekernelizing machine of: a conveyor belt comprising a plurality of individual conveyor bars operatively linked to one another, each conveyor bar comprising a base support, a cutting knife extending longitudinally of and rigidly fixed to said base support and stop means posteriorly located on said base support for limiting rearward movement of nuts supported on and to be hulled by means of said cutting knife; means for providing backing support to said base support of said conveyor bars opposite the point at which said cutting knives penetrate the hull of the nuts to be dekernelized; and crushing means aligned with said backing support means and displaced therefrom sufficiently to permit passage of said conveyor belt and its knives and supported nuts therebetween and adapted to engage said supported nuts to force said knives into the hulls and effectively crack the hulls of nuts passing therebetween.

17. The combination of claim 16 wherein said stop means of two adjacent conveyor bars are so constructed relative to one another and to the cutting knife between them that a nut, positioned between said pair of stop means, will be in 3-point contact with said pair of stop means and with said cutting knife therebetween.

18. The combination of claim 17 wherein said means for providing backing support to said base support comprises a roll about which said conveyor belt passes, said roll being of such diameter that each conveyor bar tilts forward, immediately after the supported nuts thereon are cracked, sufficiently to provide room for forward separation of the front halves of the nuts presently being cracked on the immediately succeeding conveyor bar.

19. The combination of claim 16 wherein said crushing means is yieldingly supported to permit its displacement away from said cutting knives to avoid jamming or breakage of parts when non-crushable foreign matter or oversized non-crackable nuts pass between said crushing means and said knives.

References Cited in the file of this patent
UNITED STATES PATENTS

| | | |
|---|---|---|
| 1,443,621 | Fowler | Jan. 30, 1923 |
| 2,358,292 | Malhiot | Sept. 12, 1944 |
| 2,403,518 | Gaddini | July 9, 1946 |